(12) United States Patent (10) Patent No.: US 7,671,627 B1
Somani et al. (45) Date of Patent: Mar. 2, 2010

(54) SUPERSCALE PROCESSOR PERFORMANCE ENHANCEMENT THROUGH RELIABLE DYNAMIC CLOCK FREQUENCY TUNING

(75) Inventors: Arun Somani, Ames, IA (US); Mikel Bezdek, West Des Moines, IA (US)

(73) Assignee: Iowa State University Research Foundation, Inc., Ames, IA (US)

( * ) Notice: Subject to any disclaimer, the term of this patent is extended or adjusted under 35 U.S.C. 154(b) by 0 days.

(21) Appl. No.: 12/107,415

(22) Filed: Apr. 22, 2008

Related U.S. Application Data

(60) Provisional application No. 60/913,334, filed on Apr. 23, 2007.

(51) Int. Cl.
  *H03K 19/173* (2006.01)
(52) U.S. Cl. .............................. 326/46; 326/93; 714/724
(58) Field of Classification Search .................... 326/37, 326/38, 46, 93–98; 714/724–729
  See application file for complete search history.

(56) References Cited

U.S. PATENT DOCUMENTS

| 5,793,944 | A * | 8/1998 | Luick ........................... 714/15 |
| 6,754,840 | B2 * | 6/2004 | Poisner ........................ 713/500 |
| 7,219,252 | B1 | 5/2007 | Li et al. |
| 2009/0138772 | A1 * | 5/2009 | Bertacco et al. ............. 714/733 |

OTHER PUBLICATIONS

Bezdek, Mikel Anton, "Utilizing Timing Error Detection and Recovery to Dynamically Improve Superscalar Processor Performance", Thesis, Iowa State University, 2006, pp. 1-51.

Ernst, Dan et al., "Razor: A Low-Power Pipeline Based on Circuit-Level Timing Speculation", 36th International Symposium on Microarchitector (MICRO-36'03), IEEE Computer Society, 0-7695-2043-X/03, 2003, 12 pages.

Subramanian, Viswanathan et al., "Superscalar Processor Performance Enhancement Through Reliable Dynamic Clock Frequency Tuning", 37th Annual IEEE/IFIP International Conference on Dependable Systems and Networks (DSN 2007), Jun. 25-28, 2007, Edinburgh, United Kingdom, 10 pages.

Uht, Augustus K., "Uniprocessor Performance Enhancement through Adaptive Clock Frequency Control", IEEE Transactions on Computers, vol. 54, No. 2, Feb. 2005, pp. 132-140.

* cited by examiner

*Primary Examiner*—Don P Le
(74) *Attorney, Agent, or Firm*—McKee, Voorhees & Sease, P.L.C.

(57) ABSTRACT

In the case of a pipelined processor, a performance gain is achievable through dynamically generating a main clock signal associated with a synchronous logic circuit and generating at least one backup register clock signal, the backup register clock signal at the same frequency as the main clock signal and phase shifted from the main clock signal to thereby provide additional time for one or more of the logic stages to execute. Error detection or error recovery may be performed using the backup registers. The methodology can further be extended, to design a system with cheaper technology and simple design tools that initially operates at slower speed, and then dynamically overclocks itself to achieve improved performance, while guaranteeing reliable execution.

30 Claims, 8 Drawing Sheets

SUPERSCALE PROCESSOR PERFORMANCE ENHANCEMENT THROUGH RELIABLE DYNAMIC CLOCK FREQUENCY TUNING

CROSS-REFERENCE TO RELATED APPLICATIONS

This application claims priority under 35 U.S.C. § 119(e) to provisional application Ser. No. 60/913,334 filed Apr. 23, 2007, herein incorporated by reference in its entirety.

GRANT REFERENCE

Work for this invention was funded in part by a grant from the United States Government, NSF Grant No. CCF0311061. The Government may have certain rights in this invention.

BACKGROUND OF THE INVENTION

Modern processors, and in fact all synchronous logic circuits use a clock to control execution of the circuit. The speed of this clock, which in large part determines how quickly the processor runs applications, is traditionally limited by worst case delay. That is, the clock must be slow enough to give the circuit the maximum time it will need to execute correctly, also called its propagation delay. However, this delay cannot be determined precisely because of three main factors. First, when computer chips are produced, manufacturing induced variations create variable delays in the chips. Second, during operation, variations in environmental conditions such as temperature and voltage affect the delay through the circuit. Finally, although it is possible to find the longest paths through the logic, it is not known how often the input combinations given during operation will use these paths. To avoid timing errors, traditional design assumes worst case values for these factors, giving an overly high delay estimate, and causing the clock period to be set too low.

The main limitation that this solution overcomes is the worst case delay assumption that places a minimum on the clock period of modern digital circuits. Overcoming this assumption allows circuits, such as superscalar or pipelined processors, to run at a much higher speed.

Despite numerous efforts have been made to enhance processor performance, problems remain.

BRIEF SUMMARY OF THE INVENTION

Therefore, it is a primary object, feature, or advantage of the present invention to improve over the state of the art.

A further object, feature, or advantage of the present invention is to provide improvements in synchronous logic circuits, including processors.

It is a still further object, feature, or advantage of the present invention to enable modern high performance computer processors to operate reliably at speeds higher than previously possible.

A still further object, feature, or advantage of the present invention is to provide reliable execution in a shorter time using an adaptable clock period.

Another object, feature, or advantage of the present invention is to provide for error detection.

Yet another object, feature, or advantage of the present invention is to provide for error correction.

A further object, feature, or advantage of the present invention is to provide a design methodology that may be implemented using low cost technology and simple design tools.

A still further object, feature, or advantage of the present invention is to provide a design methodology that modifies a design which operates at a slower clock rate to a design which dynamically overclocks itself to operate at a much faster clock rate while guaranteeing reliable execution at all times.

A still further object, feature, or advantage of the present invention is to provide a design methodology that allows to make use of earlier generation technology to initially implement a design, which reduces power consumption and heat generation while operating at a slower clock rate, and allow that design to dynamically overclock itself to operate at a faster clock rate while guaranteeing reliable execution within the power and heat budgets at all times.

One or more of these and/or other objects, features, or advantages of the present invention will become apparent from the specification and claims that follow.

This invention allows modern high performance computer processors to operate reliably at speeds higher than previously possible. A distinguishing feature of the design is to explore the fact that not all data inputs require the worst case delay time to compute correctly. Thus overclocking will cause errors to occur only in a few cases and the effect of those errors can be corrected with the available fault detection and recovery circuitry in time to not allow the error to propagate. The higher speeds are provided by an application of fault tolerance combined with dynamic control theory. This technique may be applied to any modern processor, since the limitation it overcomes is applicable to all synchronous logic circuits. In an environment where speed is a key driving factor, this technique provides reliable execution in a shorter time with an adaptable clock period. The clock is adapted in such a way that the correct execution including the error recovery time is completed in a smaller time than what it would take to compute at the slower clock rate determined using the worst case delay estimation.

According to one aspect of the present invention, a method for improving performance of a synchronous logic circuit having logic stages is provided. The method includes dynamically generating a main clock signal associated with the synchronous logic circuit and generating at least one backup register clock signal, the backup register clock signal at the same frequency as the main clock signal and phase shifted from the main clock signal to thereby provide additional time for one or more of the logic stages to execute. The method further includes driving the at least one backup register of the synchronous logic circuit with one of the at least one backup register clock signal. Data values stored in the one or more backup registers may be used for error detection or error recovery.

According to another aspect of the present invention, a method for improving processor performance is provided. The method includes providing a device having a superscalar processor, a main clock associated with the superscalar processor, a plurality of logic stages associated with the superscalar processor, and a plurality of backup registers, each of the plurality of backup registers associated with one of the plurality of logic stages. The method further provides for generating a main clock signal and generating a backup register clock signal associated with the backup registers. The backup register clock signal operates at a same frequency as the main clock signal and is phased shifted from the main clock signal to thereby provide additional time for the logic stages to execute.

According to another aspect of the present invention, an apparatus is provided which includes a synchronous logic circuit having a plurality of logic stages, a dynamically generated main clock signal associated with the synchronous logic circuit, at least one backup register for each of the plurality of logic stages, and at least one backup register clock signal, the backup register clock signal at the same frequency as the main clock signal and phase shifted from the main clock signal to thereby provide additional time for one or more of the logic stages to execute.

According to another aspect of the present invention, an apparatus is provided which includes a superscalar processor, a main clock associated with the superscalar processor, plurality of logic stages associated with the superscalar processor, a backup register for each of the plurality of logic stages. This may, in particularly be deployed in critical logic stages. The clock for each of the plurality of logic stages operates at a same frequency as the main clock and is phase shifted from the main clock to thereby provide additional time for each stage to execute. The main clock and the clock for each of the plurality of logic stages are dynamically generated.

According to yet another aspect of the present invention, an apparatus is provided which includes a synchronous logic circuit having a plurality of logic stages, a dynamically generated main clock signal associated with the synchronous logic circuit, a local fault detection and recovery (LFDR) circuit for each of the plurality of logic stages, and at least one phase shifted clock signal, the phase shifted clock signal at the same frequency as the main clock signal and phase shifted from the main clock signal to thereby provide additional time for one or more of the logic stages to execute.

According to another aspect of the present invention a method of improving design of a digital system operating at a first clock rate is provided. The method of improving the design includes modifying the design to dynamically overclock to clock rates faster than the first clock rate while guaranteeing reliable execution at all times to thereby provide improved performance.

DETAILED DESCRIPTION OF THE PREFERRED EMBODIMENT

1. Introduction

The performance of processors has traditionally been characterized by their operating frequency. The operating frequency at which a processor or any digital system is marketed, is the frequency at which it is tested to operate reliably under adverse operating conditions. In order to satisfy timing criteria, both operating and manufacturing, designers are forced to assume worst case conditions while deciding the clock frequency. Such worst case timing delays occur rarely, allowing possible performance improvement through overclocking. Over the last decade, overclocking as a means to accelerate processor performance is gaining popularity [3]. Overclocking does not guarantee reliable execution. To reliably take advantage of the performance improvement achievable through overclocking, it is necessary to tolerate timing errors, when they occur.

The variables affecting propagation delay can be divided into physical variations (introduced when a processor is fabricated) and environmental variations (introduced when a processor is in operation). Physical variations lead to both inter-die and intra-die variations. Inter-die variations are largely independent of design implementation. Intra-die variations, which are dependent on design implementation, are mostly caused by variations in gate dimension. To account for these variations, designers often assume delays three sigma from the typical delay [12]. Environmental variations such as temperature and power supply voltage also have an effect on the delay through any path. These conditions can only be estimated when fixing the clock period of a circuit.

The worst-case delay will only be observed if the longest path is exercised by the inputs. The input combinations which are responsible for the worst-case path rarely occur. For example, in the case of a ripple-carry adder the longest delay occurs only when a carry generated at the first bit position propagates through all remaining bit positions. However, a carry-chain of this sort is very rare for both random and application generated input vectors [1].

Physical and environmental factors, along with the critical path of the design, force designers to opt for worst-case clock periods, to ensure error-free operation. Since the clock period is fixed at much higher value than what is typically required, significant performance improvements can be achieved through overclocking.

A new and more conservative approach than overclocking seeks to exploit the performance gap left by worst case design parameters, while at the same time providing reliable execution. This approach, coined "better than worst-case design" [1], uses principles from fault tolerance, employing some combination of spatial and temporal redundancy. In some sense, these methodologies, described in detail in Section 2, perform overclocking with a safety net.

The present invention includes a solution, which addresses the limitations imposed by worst case design, called SPRIT$^3$E, or Superscalar Performance Improvement Through Tolerating Timing Errors [2]. The present invention allows dependence of critical path on input data to be exploited to thereby make the common case faster. The SPRIT$^3$E framework allows the clock frequency of a superscalar processor to be dynamically tuned to its optimal value, beyond the worst case limit. Because the frequency is dynamically modified as the processor is running, variations in the environmental conditions, such as temperature and voltage, as well as variations present from fabrication, are automatically adjusted for. As frequency scales to higher values, timing errors will begin to occur by design. To prevent these errors from corrupting the execution of the processor, fault tolerance in the form of temporal redundancy is used. Specifically, pipeline stages are augmented with a local fault detection and recovery (LFDR) circuit.

The amount of frequency scaling is strongly influenced by the number of input combinations responsible for the longer timing-paths. As frequency is scaled higher dynamically, more number of input combinations would result in error. The percent of clock cycles affected by errors impact the performance. Each time an error occurs, additional time is required to recover from that error. We monitor the error rate during run time, and based on a set tolerable error rate that does not affect the performance we adjust the clock frequency dynamically.

Another factor that influences frequency scaling is contamination delay of the circuit. Contamination delay is the minimum amount of time beginning from when the input to a logic becomes stable and valid to the time that the output of that logic begins to change. We explain in Section 4 how contamination delay limits frequency scaling. In Section 6, we explain how we can overcome this limitation, using CLA adders to illustrate our point.

To evaluate the $SPRIT^3E$ framework, several experiments were performed. First, to explore the possibilities of dynamic frequency scaling, an 18×18 multiplier was operated at varying frequencies, and the number of resultant timing errors was observed. Next, having developed a LFDR framework that shows an achievable frequency 44% faster than the worst case level with the multiplier, the technique was applied to a superscalar processor. Using a superscalar processor synthesized in an FPGA, the frequency and application dependent timing error behavior was analyzed. Then with these results, the ability of the $SPRIT^3E$ methodology to provide performance improvement was determined for varying error sampling implementations. For long term execution, on an average, all benchmarks show an achievable performance improvement of up to 57% when continuous error sampling technique is implemented.

The rest of the detailed description is organized as follows: Section 2 provides a review of related literature. The error mitigation technique and global recovery in superscalar processors is described in Section 3. In Section 4, a description of the clocking system used to generate the dynamically modifiable clock is given. In Section 5, dynamic clock tuning methodology is presented along with three different error sampling techniques. In Section 6, the effect of contamination delay on frequency scaling is studied. Our experimental framework and results are presented in Section 7. Section 8 concludes.

2. Related Work

Since the traditional design methodology assumes that clock frequency is fixed at the worst case propagation delay, a large body of work exists to improve synchronous circuit performance without violating this assumption. Common techniques such as device scaling and deeper pipelining have been extensively used to increase processor performance. However, as observed in [6, 7, 19], there is an upper bound on the effectiveness of these techniques. Future increases in processor performance will be made by a promising new research paradigm known as "better than worst-case design".

Several strategies have been proposed that apply fault tolerance to a processor with the goal of improved performance past worst case limits. Both the SSD [9] and DIVA [17] architectures apply fault tolerance in the form of a redundant processor. In these mechanisms instructions may be re-executed and checked. Therefore timing errors may be allowed to occur in the main processor. However, the authors do not analyze the frequency dependent error behavior and thus do not quantify the amount of achievable performance gain. In [10], the issue, register renaming, and ALU logic of a superscalar processor are replaced with approximate versions that execute in half the time but not necessarily correct. Two versions of the original ALU and register renaming logic are required to detect errors in the approximate versions. Thus this scheme has a high overhead.

TEATIME, proposed in [16], scales the frequency of a pipeline using dynamic error avoidance. However, this technique ignores the input dependence of the observed delay. Thus, it will stabilize on a frequency that is too conservative. The optimal operating frequency of a processor is dynamically achievable only when timing errors are detected and recovered from. TIMERTOL [15] design methodology uses an overclocked logic block with multiple safely clocked blocks of the same logic.

The RAZOR architecture, [4, 5], uses temporal fault tolerance by replicating critical pipeline registers in order to dynamically scale voltage past its worst case limits. The replicated registers use a phase shifted clock. We use a similar scheme in our paper. Razor achieves lower energy consumption, by reducing supply voltage in each pipeline stage. Our goal is to allow faster execution for non worst-case data by dynamically varying the operating frequency. In RAZOR, an internal core frequency generator is available which is capable of generating clocks at different frequencies, and the duration of the positive clock phase is also configurable. However, the clock frequency is configured and fixed before program execution. We dynamically adjust the clock frequency to the optimal value during run time. This requires an on-line error rate monitoring but offers higher improvement.

In [11], the trade-off between reliability and performance is studied, and overclocking is used to improve performance of register files. We use overclocking in critical pipeline stages to improve performance of superscalar processor.

3. Timing Error Mitigation

To allow a superscalar processor to operate at frequencies past the worst case limit, $SPRIT^3E$ uses local fault detection and recovery, adding redundant registers between pipeline stages. Our timing error mitigation scheme is similar to the one used in Razor [5]. This scheme is most suitable to deal with multiple bidirectional (0 to 1 and 1 to 0) errors [13].

Figure 1:
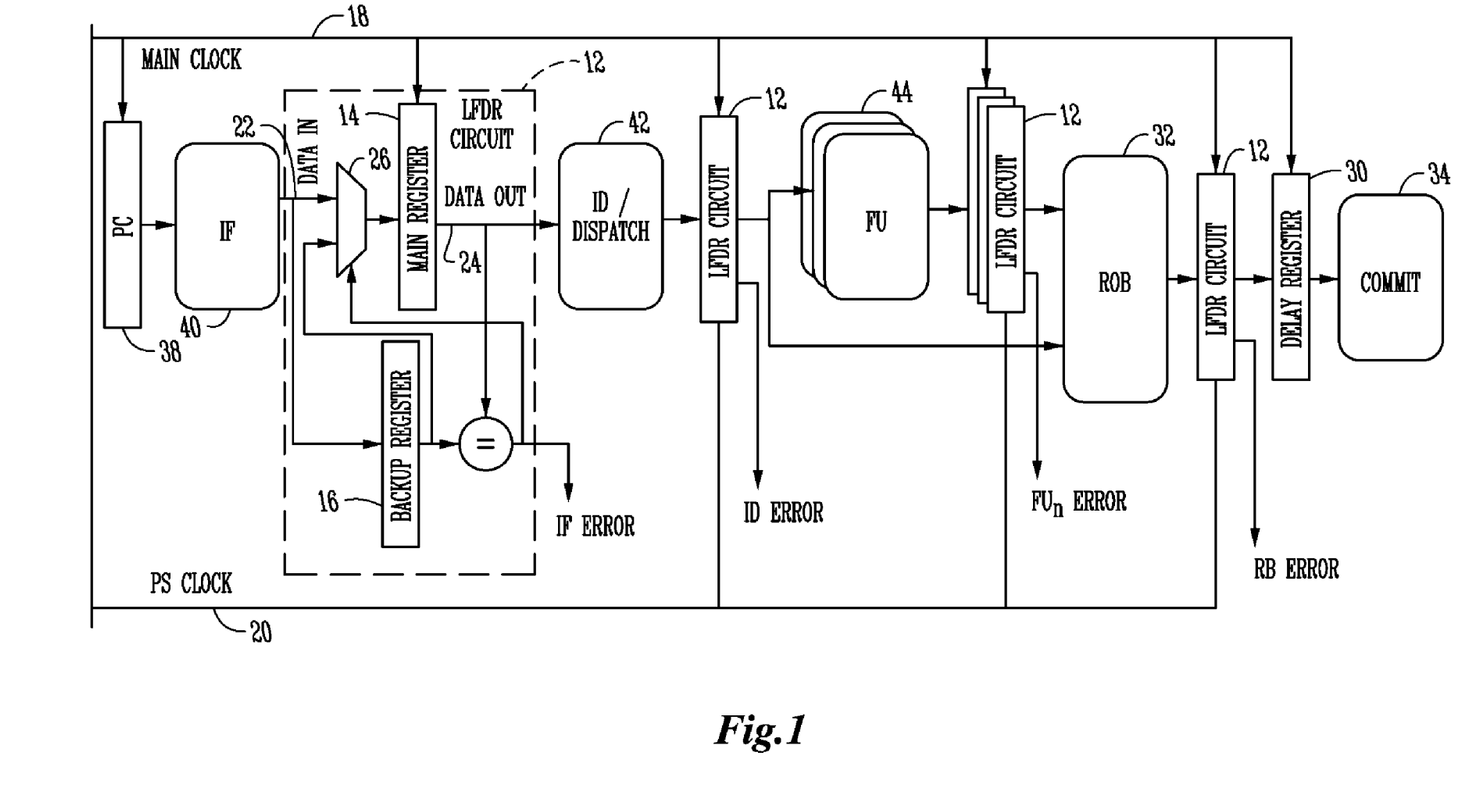
FIG. 1 is a schematic of one embodiment of a superscalar processor augmented with the SPRIT$^3$E framework.

A diagram of the $SPRIT^3E$ technique applied to a superscalar processor is shown in FIG. 1. The LFDR circuit 12 is shown in the figure. The first register or main register 14 is clocked ambitiously at a higher frequency above the frequency required for error-free operation. The backup register 16 is clocked in such a way that it is prevented from being affected by timing errors, and its output is considered "golden". In FIG. 1, Main Clock 18 is the clock controlling synchronous operation of the pipeline, as would be present in an un-augmented pipeline. PS Clock, or Phase Shifted clock 20, has the same frequency as the Main Clock 18, but is phase shifted so that its rising edge occurs after the Main Clock 18. Operation of the LFDR circuit 12 begins when the data from the pipeline logic, Data In 22, is stored in the main register 14 at the rising edge of Main Clock 18. At this point, Data Out 24 provides the stored value to the next stage, which begins to compute a result. Then the rising edge of PS Clock 20 will cause the input to be stored in the backup register 16. By comparing the output of both registers 14,16, errors can be detected and proper recovery steps are taken, if needed, to ensure correct operation of the pipeline. When an error is detected, the erroneous pipeline stage locally recovers by overwriting the data in the main register 14 with the correct data in the backup register 16. This happens because of the multiplexer 26 that selects between Data In 22 and the data stored in the backup register 16.

The backup register 16 is always provided with sufficient time to latch the data, hence it is free from metastability issues. However, when the main register 14 is overclocked, the data and clock inputs may transition at the same time, resulting in metastability of the main register 14. To handle metastability issues, a metastability detector [5] is incorporated into the LFDR circuit. When metastability is detected in the main register, it is handled like a timing error, and the recovery mechanism is initiated.

3.1. Global Error Recovery

In addition to local recovery that takes place in the LFDR circuit 12, action must be taken on a global scale as well to maintain correct execution of the pipeline in the event of a timing error. The action taken is dependent on the location of the error. Global recovery is necessary to stall pipeline stages before the pipeline stage in which error occurred, and to insert a bubble so that subsequent pipeline stages are not affected by the error. In FIG. 1, a delay register 30 is shown between the output of the re-order buffer 32 and the commit stage 34. This register 30 is used to prevent any erroneous value from being committed during the clock cycle needed for error detection, and to ensure that the architectural state of the processor remains correct.

Four error locations are shown in FIG. 1, denoted as IF error, ID error, $FU_n$ error (n denoting $n^{th}$ functional block), and RB error. Although the exact error recovery steps taken vary by location, in terms of the behavior of the error handler, these errors can be handled in a similar manner. The exact recovery steps taken at each error location is explained in detail below.

When an error occurs in the instruction fetch stage 40, the instruction that was sent to the decode stage 42 should not be executed. To prevent execution, the instruction is reduced to a no-op in the decode stage 42. Additionally, the program counter 38 must be stalled for a cycle, so that following correction of the error, the next instruction will be fetched from the correct address. Finally, since the program counter 38 is not updated, any branch or jump instructions attempting to write to PC 38 during the stall cycle is stalled for a cycle. All other instructions in the pipeline are allowed to continue execution.

Any error occurring in the instruction decode and dispatch stage 42 is propagated to both the re-order buffer (ROB) 32, and the allocated functional unit 44. In the ROB 32, the most recent entry is cleared by updating the pointer to the head of the buffer. When the next instruction is dispatched, it will overwrite the faulty instruction. To clear the functional unit, the global error handler maintains a record of the functional unit used by the dispatcher in the previous cycle. When an error in the dispatch stage 42 is detected, that unit is cleared to prevent it from writing a wrong value to the ROB 32. Finally, the signal notifying the instruction fetch stage of a successful dispatch is lowered to prevent the IF stage 40 from fetching the next instruction during the error correction cycle.

An error in the execution of a functional unit 44 stores an incorrect value in the ROB 32. Additionally, the incorrect value is forwarded to other functional units whose operands depend on the result of the faulty FU 44. In the ROB 32, the instruction is invalidated to prevent it from being committed. The functional units 44 that have begun execution using the erroneous value are also stopped. This is accomplished by sending an error signal using the existing forwarding paths. Finally, the available signal of the faulty functional unit is lowered to prevent the next instruction from being dispatched to that FU 44.

An error in the ROB output is prevented from committing in the next cycle by the addition of the delay register 30 mentioned previously. When an error is detected, the delay register 30 is flushed to prevent a faulty commit. Also, the ROB 32 is prevented from attempting to commit a new instruction in the next cycle. This is accomplished by manipulating the ready to commit signal from the commit unit.

Figure 2:
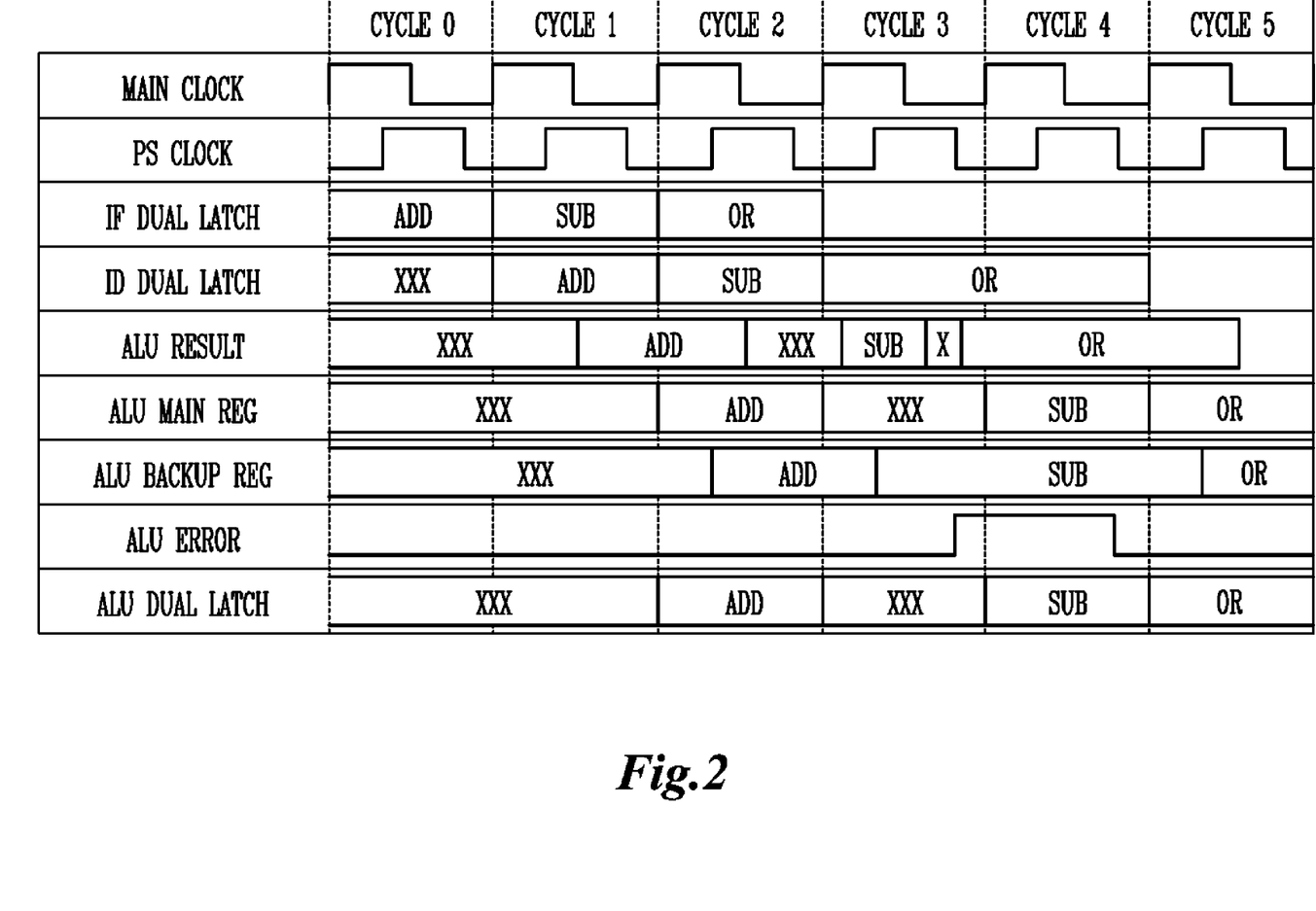
FIG. 2 is a diagram illustrating ALU error recovery according to one embodiment of the present invention.

FIG. 2 shows the timing details of the global error recovery scheme when an error occurs in the ALU functional unit. A series of ALU operations is considered, as this is the worst sequence for an error occurring in the ALU. If a different type of instruction is fetched following the ALU instruction causing a timing error, that instruction would be successfully dispatched to a different FU. In the figure, the add instruction completes error free and moves to the ROB. The sub instruction, however, does not stabilize before being captured by the main register in cycle 3. This is detected, and the ID stage is prevented from dispatching the or instruction, effectively stalling for one cycle. Additionally, the incorrect value sent to the ROB in cycle 3 is cleared.

The system shown in FIG. 1 is simplistic in that it assumes only one clock cycle for each pipeline stage. However, as was discussed in Section 2, modern, higher-level pipeline stages are subdivided to smaller, lower-level stages to allow faster clock speeds. The method of error recovery presented here is easily extensible to the superpipelined case.

Another important consideration with this design is initialization of the pipeline. Error detection and recovery is triggered only after meaningful data is present in both the main and backup registers. Also, following a pipeline flush caused by branch mis-prediction, error detection at a stage is stalled until meaningful data again reaches the stage. The delay before beginning error detection will vary between stages, and is accounted for in the design.

Due to the predictability of timing errors, SPRIT$^3$E is able to achieve high coverage and fast recovery at a modest area cost. By allowing the full worst case propagation delay of a circuit to pass before capturing the data in the backup register, timing errors in that register are prevented. Recovery takes only one clock cycle, during which the superscalar pipeline is allowed to continue execution of unaffected instructions. The area overhead for detection is kept low by re-using the combinational logic which makes up the pipeline stages, and only duplicating the registers between these stages. To further reduce the area penalty, only the stages with the longest delays is augmented with LFDR circuits. Circuitry is also added to perform the global error recovery, but this is modest as well, since the logic involved is not complex and re-uses already existing signals in the pipeline. Overall, SPRIT$^3$E provides a viable means of tolerating timing errors.

4. Dynamic Frequency Scaling

To support the LFDR circuitry and maximize the performance of the pipeline, the main and phase shifted clocks must be carefully generated. There are important considerations that determine the limits of the frequency scaling as well as the amount of the phase shift used to create the PS clock. The properties of the hardware used to generate the clocks must also be taken into account when determining the frequency modification scheme. Finally, the technique used in sampling the timing errors of the system also has implications for the achievable performance improvement.

Figure 3:
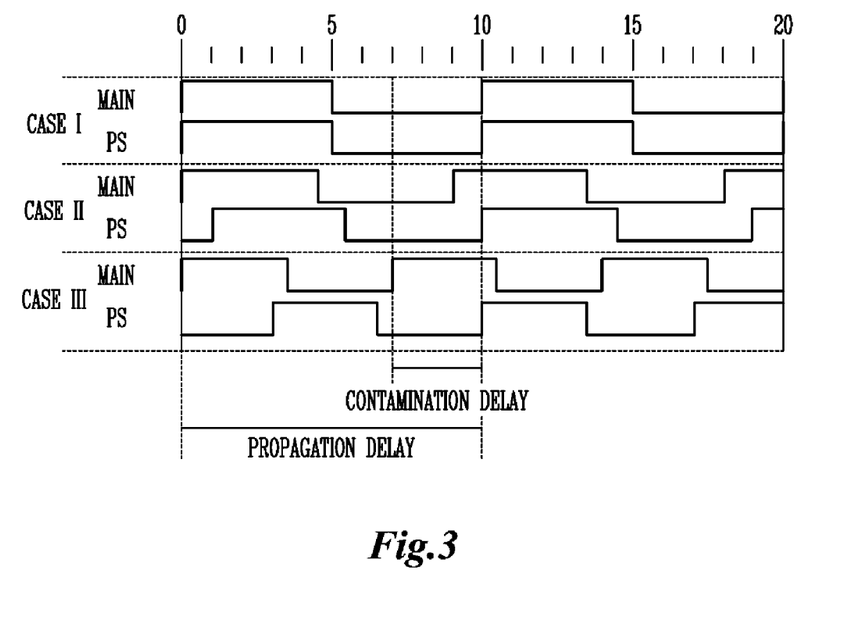
FIG. 3 is a diagram providing examples of Main and PS clocks according to one embodiment of the present invention.

The timing error tolerance provided by the SPRIT³E hardware requires support from precise clock generation. FIG. 3 shows three possible ways of generating the two clocks when the worst case propagation delay is 10 ns, and the contamination delay is 3 ns.

- In Case I, there is no frequency scaling, and the clock period of the main clock is equal to the propagation delay. As a result, there is no need to phase shift the PS clock. The two clocks are identical in this case.
- In Case II, the frequency of the main clock is scaled higher, and the clock period of the main clock now is 9 ns. To compensate for this reduced clock period, the PS clock is phase shifted by 1 ns, so that from the rising edge of the main clock to the second rising edge of the PS clock, we have the full propagation delay of the logic circuit. Although there is a rising edge of PS clock 1 ns after the rising edge of main clock, it will not corrupt the data to be stored in the redundant register as new inputs to the logic will take at least a time period equivalent to contamination delay to change the output.
- Case III shows the maximum possible frequency scaling. In this case, the clock period of the main clock is 7 ns, and the phase shift of the PS clock is 3 ns. It is not possible to scale further because if the phase shift is increased beyond the contamination delay of the circuit, the redundant register may get incorrect result and cannot be considered "golden".

Impact of error rate on performance. A factor that limits frequency scaling is error rate. As frequency is scaled higher, the number of input combinations that result in delays greater than the new clock period also increases. Each error takes additional cycles to recover. We analyzed the impact in the following.

Let $t_{old}$ denote the original clock period.
Let $t_{new}$ denote the clock period after frequency scaling.
Let $t_{diff}$ be the time difference between the original clock period and the new clock period.

If a particular application takes n clock cycles to execute, then the total execution time is reduced by $t_{diff} \times n$, if there is no error.

Let $S_e$ denote the fraction of clock cycles affected, by errors, due to scaling.

Let k be the number of cycles needed to recover from an error.

To achieve any performance improvement, Equation 1 must be satisfied.

$$S_e \times n \times k \times t_{new} < t_{diff} \times n \quad (1)$$

$$S_e < \frac{t_{diff}}{t_{new} \times k} \quad (2)$$

According to Equation 2, for Case III in FIG. 3, the error rate must be higher than 42% for this technique to yield no performance improvement when k=1. For Case II in FIG. 3, since the frequency scaling is modest, the error rate must be kept below 11% to achieve any performance improvement.

Speedup calculation. The overall speedup achievable using our technique is derived below and is given by Equation 5.

In a computation, it is possible that when the clock frequency is scaled there is an increase in the total number of execution cycles. For instance, in a pipelined processor, when the processor accesses memory, the number of clock cycles taken for that memory operation increases when the frequency is scaled, if the clock frequency of the memory remains constant. Consider a processor whose clock period is 10 ns, and a memory access which takes 20 CPU cycles. If after scaling, the clock period is reduced to 5 ns, then the same memory access would take 40 CPU cycles.

Let $S_c$ denote the factor by which the number of cycles, taken to execute an application, increase because of scaling. Let $ex_{old}$ denote the old execution time. Let $ex_{new}$ denote the new execution time. Let $S_{ov}$ denote the overall speedup achieved.

$$ex_{old} = n \times t_{old} \quad (3)$$

$$ex_{new} = n \times t_{new} + S_C \times n \times t_{new} + S_e \times k \times n \times t_{new} \quad (4)$$

$$S_{ov} = \frac{ex_{old}}{ex_{new}} = \frac{t_{old}}{t_{new} \times (1 + S_c + k \times S_e)} \quad (5)$$

For Case III in FIG. 3, if we consider k to be 1, $S_e$ to be 10%, and $S_c$ to be 10%, then we achieve an overall speedup of 1.19.

5. Managing Contamination Delay to Increase Phase Shift

As explained in Section 4, the dependence of phase shift on contamination delay leads directly to the limitation of the frequency scaling. For the particular circuit illustrated in Section 4 the maximum improvement achievable using our technique is 30%. In general, the maximum improvement, dependent on the propagation delay, $t_{pd}$, and the contamination delay, $t_{cd}$, is given by $$\frac{t_{cd}}{t_{pd}}.$$

Since contamination delay limits performance improvement, it might be worthwhile to redesign the logic and increase the contamination delay. But increasing the contamination delay of a logic circuit without affecting its propagation delay is not a trivial issue [14]. At first glance, it might appear that adding delay by inserting buffers to the shortest paths will solve the problem. But delay of a circuit is strongly input dependent, and several inputs play a role in deciding the value of an output in a particular cycle.

To show that it is possible to increase contamination delay without affecting the propagation delay, we experimented on a CLA adder circuit. A 32-bit CLA adder circuit has a propagation delay of 3.99 ns, but an insignificant contamination delay of 0.06 ns, thus allowing almost no performance improvement using our technique. Our experiments indicate that by carefully studying the input-output relationship of a given circuit, it is possible to overcome the limitation imposed by contamination delay on our technique. The following case study presents our experiments and results we achieved for a CLA adder circuit.

Case Study Increasing contamination delay of CLA adder circuits. Let us first consider an 8-bit CLA adder. The propagation delay of the circuit is estimated to be 1.06 ns, and the contamination delay 0.06 ns. We synthesized the circuit using Cadence BuildGates Synthesis tool in Physically Knowledgeable Synthesis (PKS) mode. We used the 0.18 um Cadence Generic Standard Cell Library (GSCLib) for timing estimation.

For the 8-bit CLA adder, from timing reports we observed that just about 20% of the paths have a delay more than 0.75 ns. Though this is highly motivating and provides a strong reason to apply our technique, a 0.06 ns contamination delay acts as a dampener and we risk incorrect operation if the clock period is reduced beyond 1 ns. This is because, once the input to the adder stabilizes, the output starts changing after 0.06 ns, the contamination delay of the circuit. This will cause an incorrect sum to be latched by the redundant register at the first rising edge of the PS Clock following the rising edge of the Main Clock. Reliable execution is guaranteed only if the data latched in the redundant register is considered "golden".

Figure 4:
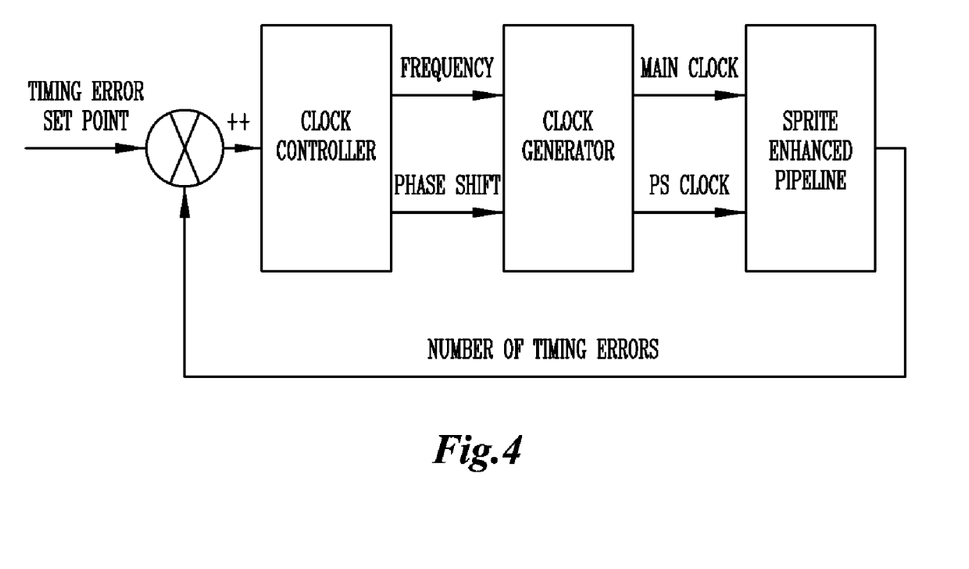
FIG. 4 is diagram illustrating one embodiment of a feedback control system used to tune clock frequency.

To overcome the limitation imposed by the contamination delay, we increased the contamination delay without affecting the propagation delay of the circuit. After carefully studying the propagation delay pattern, we observed that it is possible to increase contamination delay by distributing the additional delay either to the input side or the output side, or both. More importantly the overall propagation delay remained unchanged. FIG. 4 shows the new CLA adder circuit.

After adding delay values, the contamination delay of the circuit now is 0.37 ns, while the propagation delay remains unchanged at 1.06 ns. Now 31% of the timing paths have a delay value greater than 0.75 ns. Though we can possibly phase shift our PS Clock by 0.35 ns, reducing the clock period by that amount results in higher number of errors. Having a control over the increase in contamination delay gives us an advantage to tune the circuit's frequency to the optimal value depending on the application and the frequency of occurrence of certain input combinations. Introducing delay to increase contamination delay increases the area of the circuit. Therefore, judiciously increasing contamination delay makes sure that the increase in area is kept minimal.

Table 1 provides all relevant details before and after adding contamination delay in 8-bit, 32-bit and 64-bit CLA adder circuits. The propagation delay, $t_{pd}$ and contamination delay, $t_{cd}$ are given in "ns", and the area is given in "$\mu m^2$". As we can see there is an increase in area after increasing contamination delay. Using slower buffers the increase in area can be significantly reduced. The intention of our experiments is to demonstrate that contamination delay can be increased without affecting propagation delay for certain circuits. Logic synthesis tools have provisions to provide minimum path constraints. Depending on the various buffer sizes available in the standard cell library, the delay addition can be done area efficiently. However, delay addition increases power consumption. For the 64-bit CLA adder, the total power before adding delay is 0.0144 mW, and the total power increases to 0.0222 mW after adding delays.

TABLE 1

Impl. Details of CLA Adder Circuits

| | Original | | | Delay Added | | |
|---|---|---|---|---|---|---|
| Adder | $t_{cd}$ | $t_{pd}$ | Area | $t_{cd}$ | $t_{pd}$ | Area |
| 8-bit | 0.06 | 1.06 | 304 | 0.35 | 1.06 | 928 |
| 32-bit | 0.06 | 3.99 | 1216 | 1.21 | 3.99 | 14528 |
| 64-bit | 0.06 | 7.89 | 2432 | 1.82 | 7.89 | 47752 |

6. Dynamic Frequency Tuning and Error Sampling Techniques

Figure 5:
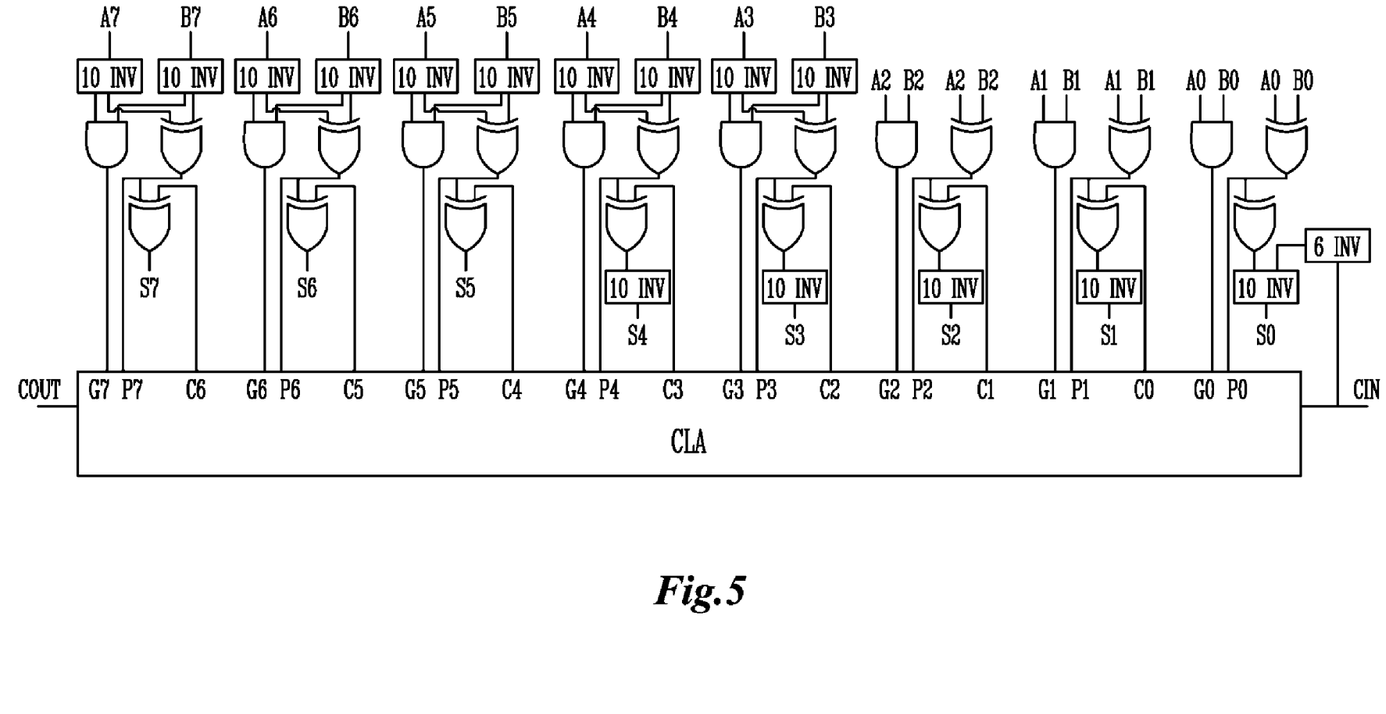
FIG. 5 is a schematic illustrating an 8-bit CLA adder with additional delay blocks to increase contamination delay according to one embodiment of the present invention.

The dynamically tuned frequency is achieved through the global feedback system pictured in FIG. 5. Before operation begins, a small, non-zero, error rate is programmed as the set point. The clock controller is initialized with the worst case delay parameters of the pipeline. As stated above, the initial frequency of the clocks is the worst case propagation delay, and the PS clock begins with no phase shift. These values are sent to the clock generator block. This block consists of a voltage controlled oscillator (VCO) in series with 2 digital clock managers (DCMs). The VCO is able to generate a variable frequency clock to meet the value given by the clock controller. The first DCM locks the output of the VCO to provide the main clock to the pipeline. The second DCM provides a dynamically modifiable phase shift. It takes the main clock as well as the value requested by the clock controller to produce the PS clock. Both DCMs provide a locked output as well, which is used to determine when the main and PS clocks have regained stability. During the period in which the clocks are being adjusted, the pipeline must be stalled. To avoid a high overhead from frequent clock switching, the number of timing errors in the pipeline will be sampled at a large interval and a new frequency determined.

When considering different sampling methods, there is a trade off between the allowable sampling frequency and the number of bits needed to store the history of errors used to measure the error rate. The length of the error history should be long enough to accurately estimate the error rate. In the following discussion, a window of 100,000 processor cycles is used. Three sampling methods are considered: discrete, continuous, and semi-continuous.

In the discrete method, a single counter keeps the error history, incrementing every cycle in which an error occurs. When the window of 100,000 cycles passes, the counter is checked, and depending on whether the error rate is greater or less than the set point, the clock period may be incremented or decremented. The error counter is then cleared, and begins to count the errors occurring in the next window of 100,000 cycles. The maximum size needed for the counter in the discrete case is 17 bits.

On the other side of the spectrum, the continuous method uses a sliding window of 100,000 cycles to maintain the history of errors. To implement this window, a 100,000 bit shift register is used, one bit for every cycle in the window. Each cycle, a bit is shifted into the register corresponding to the occurrence of an error in that cycle. The current number of errors present in the sliding window are maintained in a counter. This can be easily accomplished by comparing the value shifted out from the shift register with the value being shifted in. If these values are the same, the counter need not be changed. There are 100,000 bits needed for the shift register as well 17 bits for the counter.

In order to obtain benefits similar to the continuous case, yet avoid its high overhead, a third, semi-continuous method may be used. In this method, the error window is divided into 5 counters. Each counter maintains the total errors occurring in a separate 20,000 cycles of the error history. The counters are used in a rotating fashion, so that at every sampling, the oldest counter is cleared and begins counting. In this way, the errors may be checked every 20,000 cycles and the error rate determined using a history of 100,000 cycles. Thus the switching time is much closer to the minimum allowed by the continuous method. At the same time the overhead, while larger than the discrete case, is reasonable. Each counter needs 15 bits, so for the 5 counters, 75 bits will be required.

7. Experimental Results

To gauge the performance improvements provided by the SPRIT³E framework, a sequence of experiments were performed. An initial study of a simple multiplier circuit established that significant room for improvement does indeed exist. From there, applications executing on a superscalar processor were analyzed, and the effects of augmenting the pipeline with SPRIT³E were calculated.

Figure 6:
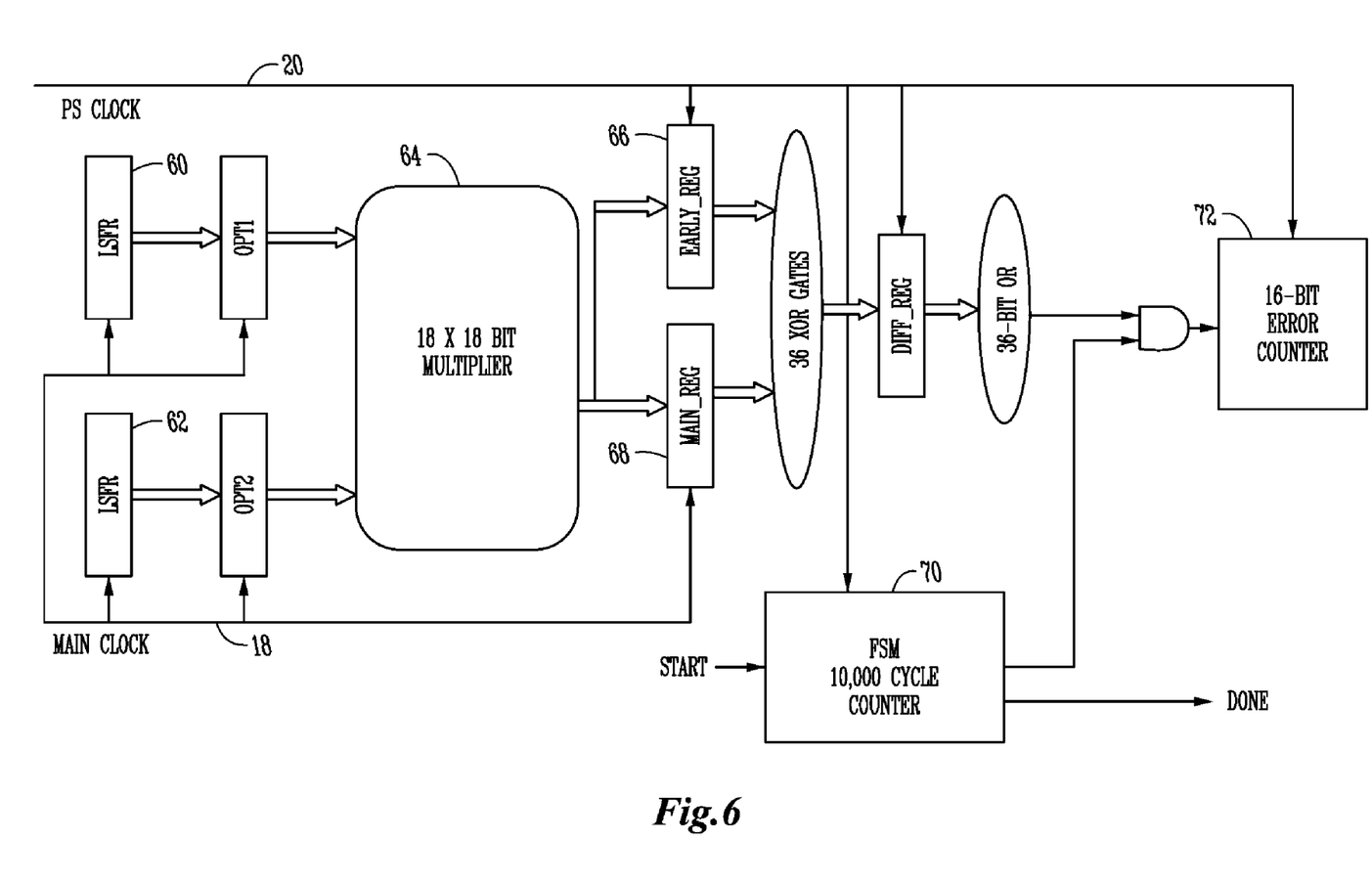
FIG. 6 is a multiplier experiment block diagram according to one embodiment of the present invention.

As a first step in evaluating this technique, the frequency induced timing errors of a multiplier circuit are observed. In [13], multiplier circuit error rates are analyzed for both inter-die and intra-die variations by effectively altering logic delay via voltage control. We perform similar experiments, but analyze operating frequency induced timing errors. The circuit is implemented in a Xilinx XC2VP30 FPGA [18]. A block diagram of the system is shown in FIG. 6. As presented in previous sections, the main and PS clocks 18, 20 operate at the same frequency, with a phase shift between them. However, in this experiment, the period of the clocks remains constant at the worst case delay. The phase shift of the PS clock 20 latches the multiplier result in the early register after a delay. In operation, two linear feedback shift registers 60, 62 provide random inputs to the multiplier logic each main clock cycle. To minimize the routing delays, an 18×18 multiplier block 64 embedded into the logic of the FPGA is used. The output is latched first by the early register 66, and a phase shift later by the main register 68. Error checking occurs at every cycle, and is pipelined to allow maximum shifting of the PS clock 20. A finite state machine (FSM) 70 is used to enable the error counter 72 for 10,000 cycles. To prevent the counter 72 from counting errors that occurs when initializing the pipeline, the FSM 70 begins enabling after 4 delay cycles have passed.

The worst case propagation delay of the synthesized circuit is estimated at 6.717 ns by the timing analyzer. To allow plenty of time for the circuit to execute before being captured in the main register, a clock period of 8 ns is used. The phase shift of the PS clock is varied from 0 to −5.5 ns, giving effective clock periods of 8 to 2.5 ns. For each effective period, the total errors are counted for an execution run of 10,000 cycles. For instance, when the PS clock 20 is shifted such that its rising edge occurs 5 ns before the main clock 18, the multiplier logic is effectively being given 3 ns to compute. At this frequency, about 94% of the 10,000 cycles produce a timing error.

Figure 7:
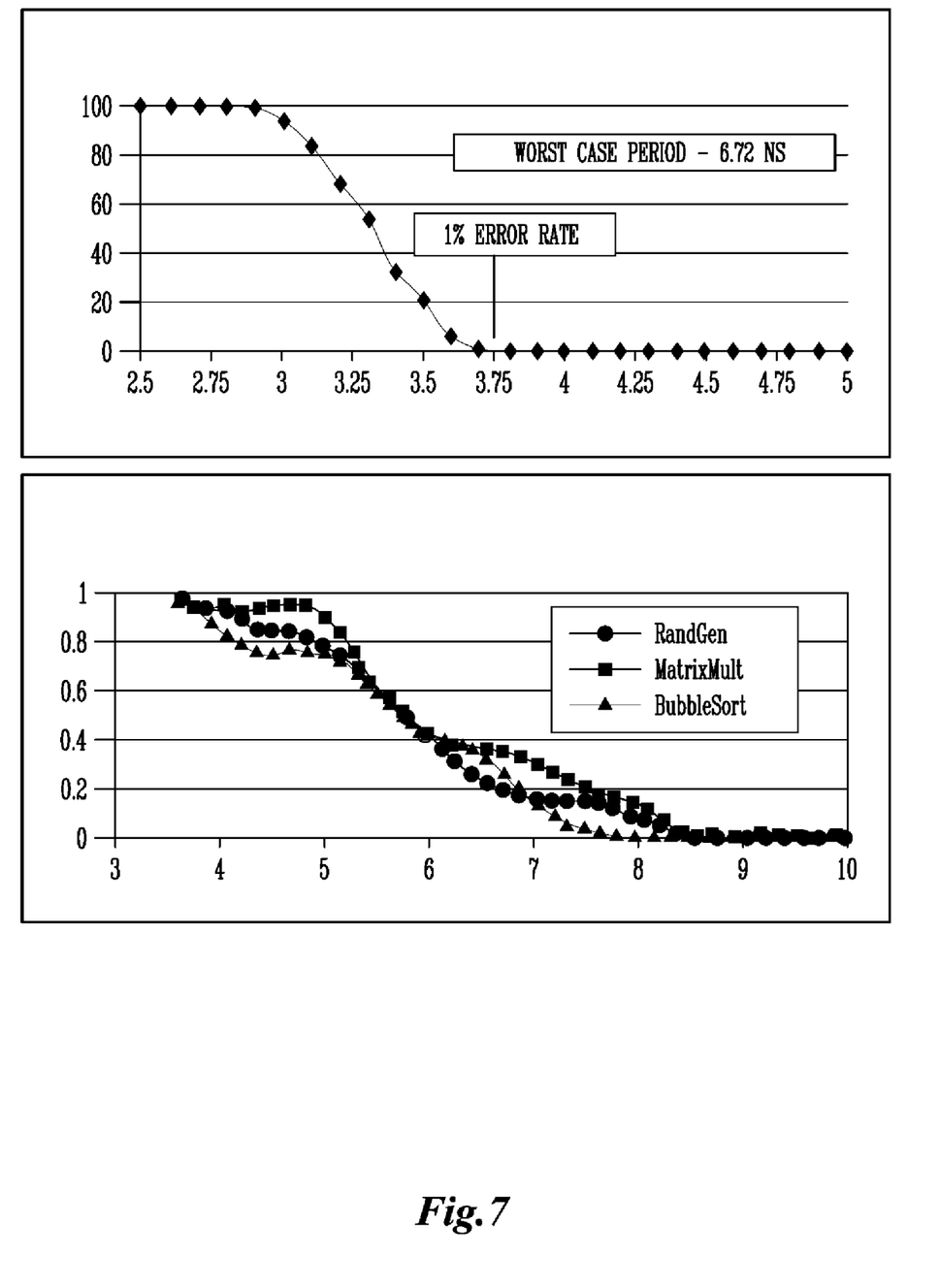
FIG. 7 provides graphs illustrating the percent of error cycles versus the clock period for the multiplier circuit and DLX processor according to one embodiment of the present invention.

FIG. 7 presents the percentage of cycles that produce an error for different effective clock periods. As shown, although the worst case delay was estimated at 6.717 ns, the first timing errors do not begin occurring until a period of under 4 ns. Using a method such as LFDR, to tolerate a small amount of timing errors, allows this circuit to run at almost half the period giving a speedup of 44%.

7.1. Evaluation of SPRIT3E Framework

Having observed the large effect of worst case margins in the multiplier circuit, the next step is to evaluate the ability of the SPRIT³E framework to exploit these margins and improve the performance of a superscalar processor. First, a suitable processor is chosen and implemented in the Virtex II Pro FPGA. Then, the frequency induced timing error behavior of the processor is analyzed using a method similar to the multiplier circuit. Finally, using the error rates obtained from execution in the FPGA, the effects of using the SPRIT³E framework are evaluated for different error sampling methods.

For this experiment, a modified version of the DLX superscalar processor, available from [8], is used. The relevant parameters of the processor are summarized in Table 2. The superscalar DLX processor is synthesized for the Xilinx XC2VP30 FPGA. The maximum timing delay between registers in this circuit is 21.982 ns, between the source registers of the MDU and the data registers of the ROB. Similar delays, all around 20 ns, exist through the other functional units to the ROB, as well as from the dispatch stage to the ROB. Thus, to analyze the timing error rates of the processor, the ROB registers are augmented with additional registers as well as the comparing and counting circuitry shown in FIG. 6. The processor is operated at varying phase shifts of the PS clock, and the percentage of cycles in which an error occurred for the execution run is recorded. For the benchmarks run on the FPGA, the processor state and the output of the program is checked for correctness after program execution.

TABLE 2

DLX processor parameters

| Parameters | | Value |
|---|---|---|
| Decode/Issue/Commit bandwidth | | 2 |
| Reorder Buff Entries | | 5 |
| Number of Function Units | Arithmetic Logic Unit | 1 |
| | Multiply Divide Unit | 1 |
| | Branch Resolve Unit | 1 |
| | Load Store Unit | 1 |
| Instruction and Data Cache Size (Bytes) | | 64 |
| Memory Size (KBytes) – 2 Cycle Access | | 64 |

FIG. 7 shows the error rates of operating the DLX at effective periods between 10 and 3.5 ns for 3 different benchmarks. The RandGen application performs a simple random number generation to give a number between 0 and 255. One million random numbers are generated, and the distribution of the random variable is kept in memory. The MatrixMult application multiplies two 50×50 integer matrices and stores the result into memory. The BubbleSort program performs a bubblesort on 5,000 half-word variables. For this application the input is given in the worst case unsorted order. As shown in the figure, for both RandGen and MatrixMult, the errors become significant at around 8.5 ns, while the error rate of BubbleSort stays low until around 8 ns. This is because both the MatrixMult and RandGen applications use the MDU, and are thus likely to incur the worst case path. The BubbleSort uses only the ALU to perform comparisons as well as addition and subtraction, so it is able to operate at lower periods before errors begin to occur.

Using the probability distribution for the error rate determined in the previous step, a simulator is written to evaluate the effectiveness of the SPRIT³E framework using the different methods of error sampling discussed in Section 5 at a set tolerable error rate of 1%. The clock period is allowed to change after a certain number of cycles have passed, which is dependent on the sampling method. In this experiment, the amount by which the clock period is allowed to change is held constant for different sampling methods. Each benchmark is evaluated separately, and is executed for its original number of cycles, reported in Table 3, as well as for a long run of 120 million cycles.

TABLE 3

Length of Applications in Cycles

| Application | Cycles to Execute |
|---|---|
| MatrixMult | 2901432 |
| BubbleSort | 118896117 |
| RandGen | 15750067 |

Figure 8:
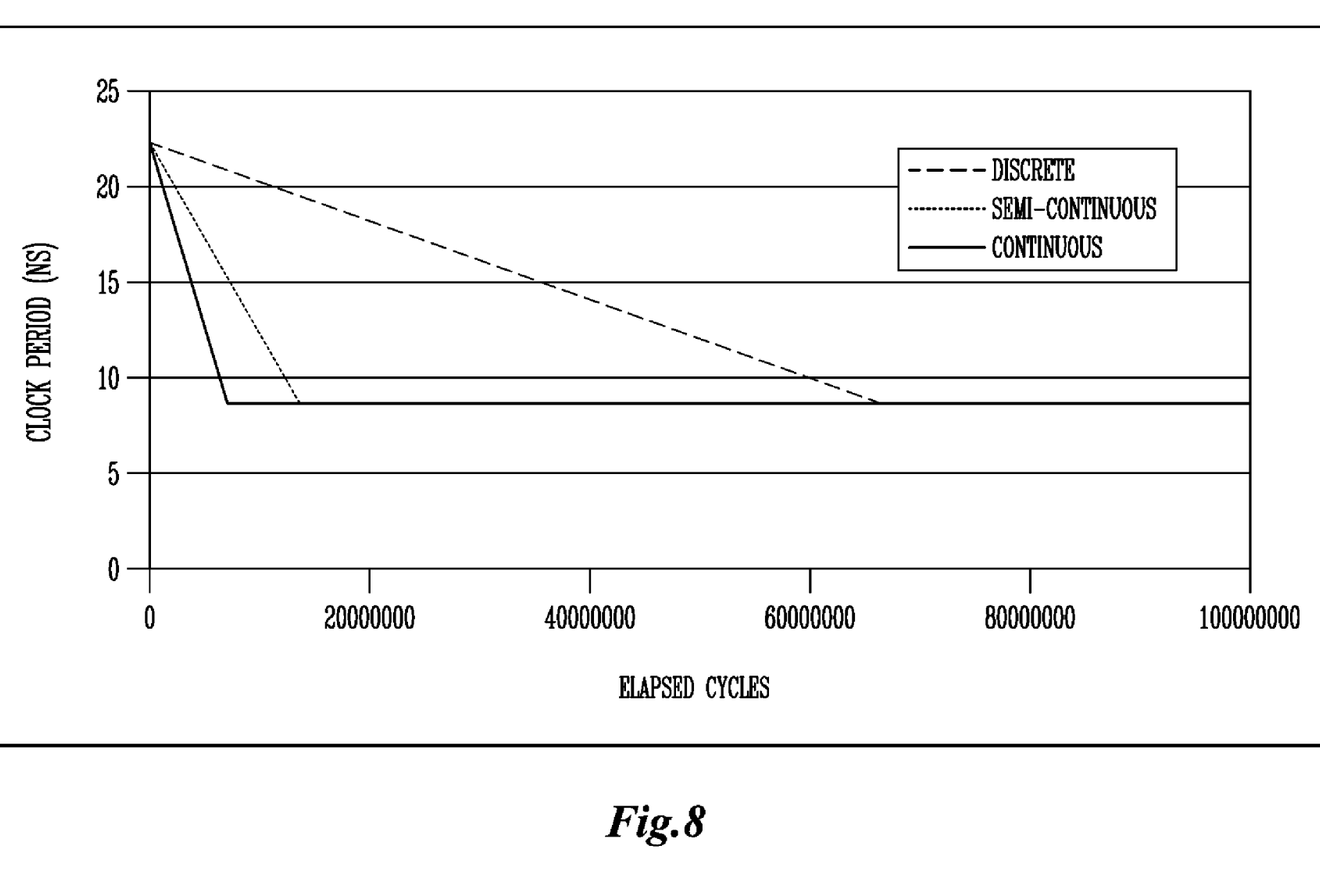
FIG. 8 provides a graph illustrating dynamically scaled clock period versus the elapsed cycles for MatrixMult according to one embodiment of the present invention.

The scaling behavior for the matrix multiplier application executed for a long run is shown in FIG. 8. The figure highlights the differences between discrete, semi-continuous, and continuous sampling. The other applications show similar period scaling over the course of execution. As the figure demonstrates, the long intervals between switching for the discrete sampling method prevent it from reaching the optimal period as quickly as the continuous and semi-continuous cases. This has important implications for the performance gains achievable by the discrete sampling method.

Figure 9:
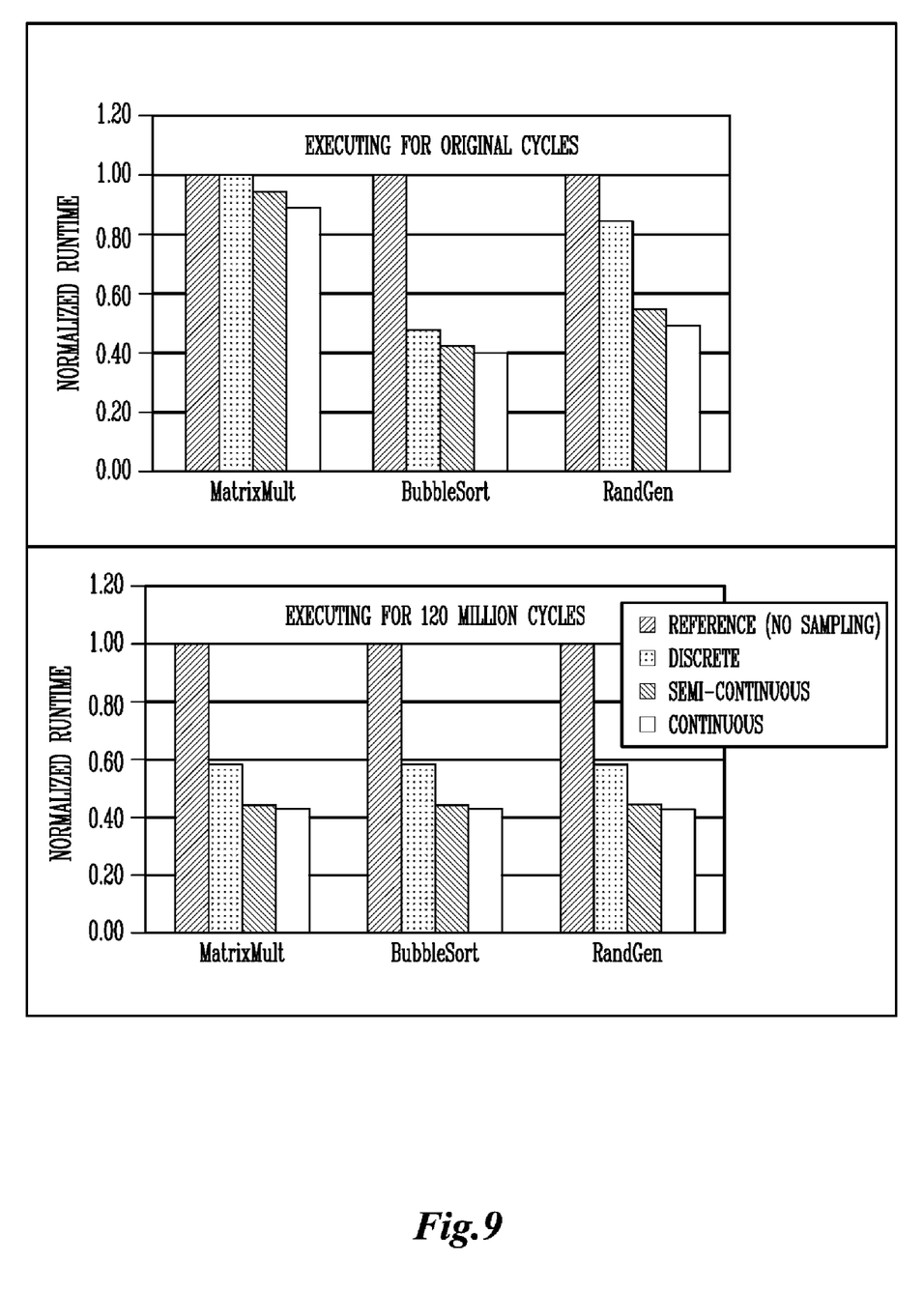
FIG. 9 provides graphs illustrating relative performance gains for different applications.

As the simulation is running, the execution time of the application is calculated. The reference execution run sets the period at the worst case value and allows no scaling, thus no timing errors occur. For the other cases, each cycle in which a timing error occurs results in a stall cycle being injected into the pipeline. Also, when a change in period occurs, the time taken to lock the DCMs to the new frequency is added to the total execution time. The execution times for each application when run for its original execution cycles normalized to the reference worst case time is shown in FIG. 9. The BubbleSort application shows the best performance, as it runs the longest and thus runs the longest at the optimal period for any sampling method. The Matrix-Mult application, however, is only long enough for gains achieved by lowering the period to begin to outweigh the penalties for doing so. Each benchmark was also evaluated by running for a longer execution time. The performance results are presented in FIG. 9. For this variation, all benchmarks perform similarly, with the discrete error sampling method giving on average a 43% improvement over the worst case, and the semi-continuous and continuous methods outperforming it at 56% and 57% respectively.

Speedup Calculation Table 4 provides the speedup achievable for multiplier circuit, 32-bit and 64-bit CLA adder circuits, and three different benchmarks run on DLX processor augmented with SPRIT³E framework. The overclocking technique is applied to the CLA adders after increasing their contamination delay, as explained in Section 6. The new contamination delay values are the ones reported in Table 1 in Section 6. The experimental setup for the adder is similar to the one explained for the multiplier circuit. Equation 5, derived in Section 4, gives the speedup, $S_{ov}$. We consider k to be 1, and $S_c$ to be 10%. The $S_c$ factor is ignored for the multiplier and adder circuits. We calculate speedup for an error rate target of 1%.

TABLE 4

Speedup Calculation

| ALU Circuit | $t_{old}$ | $t_{new}$ | $S_{ov}$ |
| --- | --- | --- | --- |
| Multiplier | 6.72 | 3.75 | 1.77 |
| 32-bit CLA | 3.99 | 3.3 | 1.19 |
| 64-bit CLA | 7.89 | 6.2 | 1.27 |
| MatrixMult | 21.98 | 8.5 | 2.33 |
| BubbleSort | 21.98 | 8.0 | 2.47 |
| RandGen | 21.98 | 8.5 | 2.33 |

While calculating the speedup in Table 4, we did not take into account the time margins added to the propagation delay, because of physical and environmental factors. In reality, the original clock period would be fixed at a higher value than the circuit's propagation delay, leaving room for further frequency scaling. Contamination delay is increased to allow the necessary phase shift.

Impact on area and power consumption: To guarantee reliable execution when operating at higher than worst-case speeds, we introduce LFDR circuits in place of flip-flops in the pipeline stages, and to remove the limitations imposed by short paths on frequency scaling we added delay buffers to increase the delay of short paths. This in turn, increases the area and power consumption of the superscalar processor.

Table 5 provides synthesis results for the unmodified DLX superscalar processor and the one augmented with the SPRIT³E framework. Both designs are mapped to Xilinx Virtex II Pro FPGA using Xilinx ISE 8.2 synthesis tool. There is a 3.12% increase in the number of flipflops. The increase in combinational logic part is 0.3%. The net increase in area because of the SPRIT³E framework is 3.2% (calculated from equivalent gate count). For our experiments on DLX superscalar processor, we do not increase the contamination delay of any pipeline stage.

TABLE 5

FPGA synthesis results

| Processor | Flipflop Count | Comb. Area (4-LUTs) | Equiv. Gates |
| --- | --- | --- | --- |
| Unmodified DLX | 5150 | 14363 | 164760 |
| SPRIT³E DLX | 5313 | 14407 | 170048 |

Currently, minimizing power consumption is one of the major concerns in processor design. Considering that we replace only those pipeline registers in the critical path with LFDR circuits and increase the power consumption minimally. From Xilinx Xpower reports, we observe that there is no significant difference in the total power consumed by the two processors. The SPRIT³E framework proposed is to increase superscalar processor performance by dynamically varying clock frequency. We provide a viable solution to squeeze more performance out of current superscalar processors.

8. Conclusions

As demonstrated by successful overclocking, the current practice of assuming the worst case delay to set the frequency for synchronous circuits is far too conservative. At the same time, fault tolerance is necessary to ensure reliability if timing errors are not avoided with worst case margins. The SPRIT³E framework addresses these problems with relatively simple additions to the superscalar pipeline. Only the pipeline registers are duplicated, and the large combinational logic blocks making up the stages are reused by utilizing temporal redundancy. Additional overhead comes from the error recovery logic, but this too may be kept modest by reusing existing pipeline signals whenever possible. All in all, the performance gained by operating at the optimal, sub-worst case period more than justifies the overhead of the detection and recovery logic.

Although the experimental results measured the timing errors generated in an FPGA, an extension can be made to logic implemented in ASIC technology. This work presents an initial exploration of the possibilities for taking advantage of the margins produced by worst case design mentality. In the future, implementing a main memory system for the synthesized DLX processor would allow full scale benchmarks to be evaluated, as well as allow an exploration of the effect of increasing the clock frequency on the average instructions committed per clock cycle. Another important concern in using the SPRIT³E framework is how well the phase shift can be adjusted at high frequencies. Finally, further extensions to toleration of particle induced SEUs could be explored using fault injection, and may warrant an augmentation to the SPRIT³E framework.

8.1 Options, Variations, and Alternatives

The embodiments described herein are merely exemplary and not limiting. The present invention contemplates numerous additional embodiments, variations, options, and alternatives.

For example, results from executing applications with a superscalar processor implemented in a Xilinx FPGA show a significant gap between the estimated worst case delay and the actual point at which timing errors being to occur. Simulating execution of a SPRIT³E enhanced pipeline resulted in an improvement of around 45% for all benchmark applications. These results show a great potential for this technique when applied to processors to improve their performance. Some important design considerations stemming from SPRIT³E include:

- Determining whether or not to trust the backup register. In general scheme, the backup register is always trusted as correct and is used for fast recovery. Not trusting the backup register would provide only error detection, and would require re-execution to recover, lengthening recovery time. It could, however, better protect against other types of errors, such as particle induced transient faults.
- Performing error detection only after the pipeline has been initialized. Before the first cycle in which a value is latched in the main register, the main and backup registers may differ in value. However, this should not be detected as an error in the circuit.
- Increasing the contamination delay of a stage without affecting the propagation delay. On the surface, adding delay to the shortest paths in the circuit seems an easy and viable solution. However, increasing short path delays without affecting critical path delays is much more complex.
- Determining the method by which the error rate of the processor is monitored. We explore three possible methods: discrete, continuous, and semi-continuous. These methods vary in the way they store the history of errors, which in turn effects the rate of scaling and the ease of implementation. Of the three, semi-continuous appears to be a good comprise between the high performance of the continuous method and the easy to implement discrete method.
- Varying the phase shift per stage in the pipeline. Each stage will have different propagation and contamination delays, and it may be beneficial to give some stages longer to execute by lengthening the phase shift of that stage. Another consideration that may be beneficial along this line is re-timing, which seeks to move computation between stages in order to equalize delay of all stages.

These design considerations are merely illustrative of possible variations in the design as may be appropriate in a particular application or use of the invention. The present invention contemplates numerous other variations including in the type of synchronized logic circuit used, the number and types of stages associated with the synchronized logic circuit, whether error recovery is used, variations in phase shift applied to different stages, the type of LFDR circuit used, and other variations in structure, methodology, and design considerations.

REFERENCES

[1] T. Austin, V. Bertacco, D. Blaauw, and T. Mudge. Opportunities and challenges for better than worst-case design. In *Asia and South Pacific Design Automation Conference*, volume 1, pages 2-7, January 2005.

[2] M. Bezdek. Utilizing timing error detection and recovery to dynamically improve superscalar processor performance. Master's thesis, Iowa State University, 2006.

[3] B. Colwell. The zen of overclocking. *IEEE Computer*, 37(3):9-12, March 2004.

[4] S. Das, D. Roberts, S. Lee, S. Pant, D. Blaauw, T. Austin, K. Flautner, and T. Mudge. A self-tuning dvs processor using delay-error detection and correction. *IEEE Journal of Solid-State Circuits*, 41(4):792-804, April 2006.

[5] D. Ernst, N. S. Kim, S. Das, S. Pant, R. Rao, T. Pham, C. Ziesler, D. Blaauw, T. Austin, K. Flautner, and T. Mudge. Razor: A low-power pipeline based on circuit-level timing speculation. In *36th Annual IEEE/ACM International Symposium on Microarchitecture*, pages 7-18, 2003.

[6] D. J. Frank, R. H. Dennard, E. Nowak, P. M. Solomon, Y. Taur, and H.-S. P. Wong. Device scaling limits of si mosfets and their application dependencies. *Proceedings of IEEE*, 89(3):259-288, March 2001.

[7] A. Hartstein and T. R. Puzak. The optimum pipeline depth for a microprocessor. In *29th annual international symposium on Computer architecture*, pages 7-13, May 2002.

[8] J. Horch. A superscalar version of the dlx processor. date accessed: Nov. 25, 2006, 1997.

[9] S. Kim and A. K. Somani. Ssd: An affordable fault tolerant architecture for superscalar processors. In *Pacific Rim International Symposium on Dependable Computing*, pages 27-34, December 2001.

[10] T. Liu and S.-L. Lu. Performance improvement with circuitlevel speculation. In *33rd Annual ACM/IEEE International Symposium on Microarchitecture*, pages 348-355, December 2000.

[11] G. Memik, M. Chowdhury, A. Mallik, and Y. Ismail. Engineering over-clocking: reliability-performance tradeoffs for high-performance register files. In *International Conference on Dependable Systems and Networks*, pages 770-779, June 2005.

[12] S. R. Nassif. Modeling and forecasting of manufacturing variations. In *Asia and South Pacific Design Automation Conference*, pages 145-149, January 2001.

[13] D. Roberts, T. Austin, D. Blauww, T. Mudge, and K. Flautner. Error analysis for the support of robust voltage scaling. In *Sixth International Symposium on Quality of Electronic Design*, pages 65-70, March 2005.

[14] N. V. Shenoy, R. K. Brayton, and A. L. Sangiovanni-Vincentelli. Minimum padding to satisfy short path constraints. In *IEEE/ACM international conference on Computer-aided design*, pages 156-161, 1993.

[15] A. K. Uht. Achieving typical delays in synchronous systems via timing error toleration. Technical report 032000-0100, University of Rhode Island, March 2000.

[16] A. K. Uht. Uniprocessor performance enhancement through adaptive clock frequency control. *IEEE Transactions on Computers*, 54(2): 132-140, February 2005.

[17] C. Weaver and T. Austin. A fault tolerant approach to microprocessor design. In *International Conference on Dependable Systems and Networks*, pages 411-420, July 2001.

[18] Xilinx. Virtex-ii pro and virtex-ii pro x fpga user guide. date accessed: Nov. 25, 2006, 2005.

[19] G. C.-F. Yeap. Leakage current in low standby power and high performance devices: trends and challenges. In *International Symposium on Physical design*, pages 22-27, 2002.

What is claimed is:

1. A method for improving performance of a synchronous logic circuit having logic stages, comprising:
   dynamically generating a main clock signal associated with the synchronous logic circuit;
   generating at least one backup register clock signal, the backup register clock signal at the same frequency as the main clock signal and phase shifted from the main clock signal to thereby provide additional time for one or more of the logic stages to execute; and
   driving the at least one backup register of the synchronous logic circuit with one of the at least one backup register clock signal.

2. The method of claim 1 further comprising using data values stored in the at least one backup register for error detection.

3. The method of claim 2 further comprising using data values stored in the at least one backup register for error recovery.

4. The method of claim 3 wherein the step of using the backup registers for error recovery comprises placing a correct value from one of the backup registers into a corresponding main register determined by the error detection.

5. The method of claim 4 wherein the step of using the backup registers for error recovery further comprises flushing bad data from the logic stages.

6. The method of claim 1 wherein the step of dynamically generating the main clock signal comprises applying dynamic clock scaling.

7. The method of claim 6 wherein the step of applying dynamic clock scaling is at least partially based on contamination delay.

8. The method of claim 1 further comprising monitoring an error rate of the synchronous logic circuit.

9. The method of claim 8 wherein the monitoring is performed using a discrete method.

10. The method of claim 8 wherein the monitoring is performed using a continuous method.

11. The method of claim 8 wherein the monitoring is performed using a semi-continuous method.

12. The method of claim 1 wherein the at least one backup register clock signal includes a plurality of backup register clock signals, each of the plurality of backup register clock signals associated with at least one stage.

13. The method of claim 12 further comprising varying phase shift of each of the plurality of backup register clock signals.

14. A method for improving processor performance, comprising:
   providing a device comprising (a) a superscalar processor; (b) a main clock associated with the superscalar processor; (c) a plurality of logic stages associated with the superscalar processor; (d) a plurality of backup registers, each of the plurality of backup registers associated with one of the plurality of logic stages;
   generating a main clock signal;
   generating a backup register clock signal associated with the backup registers wherein the backup register clock signal operates at a same frequency as the main clock signal and is phased shifted from the main clock signal to thereby provide additional time for the logic stages to execute.

15. The method of claim 14 further comprising using the backup registers for error detection.

16. The method of claim 15 further comprising using the backup registers for error recovery.

17. The method of claim 16 wherein the step of using the backup registers for error recovery comprises placing a correct value from one of the backup registers into a corresponding main register determined by the error detection.

18. The method of claim 17 wherein the step of using the backup registers for error recovery further comprises flushing bad data from a pipeline associated with the superscalar processor.

19. The method of claim 14 wherein the step of generating the main clock signal comprises applying dynamic clock scaling.

20. The method of claim 19 wherein the step of applying dynamic clock scaling is at least partially based on contamination delay.

21. The method of claim 14 further comprising monitoring an error rate of the superscalar processor.

22. The method of claim 21 wherein the monitoring is performed using a discrete method.

23. The method of claim 21 wherein the monitoring is performed using a continuous method.

24. The method of claim 21 wherein the monitoring is performed using a semi-continuous method.

25. The method of claim 14 further comprising varying phase shift of each of the plurality of backup register clock signals.

26. An apparatus, comprising:
   a synchronous logic circuit having a plurality of logic stages;
   a dynamically generated main clock signal associated with the synchronous logic circuit;
   at least one backup register for each of the plurality of logic stages; and
   at least one backup register clock signal, the backup register clock signal at the same frequency as the main clock signal and phase shifted from the main clock signal to thereby provide additional time for one or more of the logic stages to execute.

27. The apparatus of claim 26 wherein the synchronous logic circuit comprises a processor.

28. The apparatus of claim 26 wherein the apparatus is contained in a single chip.

29. An apparatus, comprising:
   a superscalar processor;
   a main clock associated with the superscalar processor;
   a plurality of logic stages associated with the superscalar processor;
   a backup register for each of the plurality of logic stages;
   wherein a clock for each of the plurality of logic stages operates at a same frequency as the main clock and is phase shifted from the main clock to thereby provide additional time for each stage to execute;
   wherein the main clock and the clock for each of the plurality of logic stages are dynamically generated.

30. An apparatus, comprising:
   a synchronous logic circuit having a plurality of logic stages;
   a dynamically generated main clock signal associated with the synchronous logic circuit;
   a local fault detection and recovery (LFDR) circuit for each of the plurality of logic stages; and
   at least one phase shifted clock signal, the phase shifted clock signal at the same frequency as the main clock signal and phase shifted from the main clock signal to thereby provide additional time for one or more of the logic stages to execute.

* * * * *